United States Patent
Zhu et al.

(10) Patent No.: US 11,880,456 B1
(45) Date of Patent: Jan. 23, 2024

(54) ADAPTIVE LEAKAGE IMPACT REGION DETECTION AND MODELING FOR COUNTERFEIT CHIPS DETECTION

(71) Applicant: ANSYS, INC., Canonsburg, PA (US)

(72) Inventors: Deqi Zhu, San Jose, CA (US); Hua Chen, Chengdu (CN); Jimin Wen, Pleasanton, CA (US); Lang Lin, Cupertino, CA (US); Norman Chang, Fremont, CA (US); Dinesh Selvakumaran, Pflugerville, TX (US); Gang Ni, Chengdu (CN)

(73) Assignee: ANSYS, INC., Canonsburg, PA (US)

( * ) Notice: Subject to any disclaimer, the term of this patent is extended or adjusted under 35 U.S.C. 154(b) by 110 days.

(21) Appl. No.: 17/445,048

(22) Filed: Aug. 13, 2021

(51) Int. Cl.
*G06F 21/55* (2013.01)

(52) U.S. Cl.
CPC ...... *G06F 21/556* (2013.01); *G06F 2221/034* (2013.01)

(58) Field of Classification Search
CPC ... G06F 21/556; G06F 21/56; G06F 2221/034
See application file for complete search history.

(56) References Cited

U.S. PATENT DOCUMENTS

| | | | |
|---|---|---|---|
| 2007/0030031 A1* | 2/2007 | Degrendel | G06F 21/755 326/95 |
| 2010/0329446 A1* | 12/2010 | Degrendel | G06F 21/755 380/28 |
| 2011/0228926 A1* | 9/2011 | Shumow | H04L 9/003 380/1 |
| 2012/0079602 A1* | 3/2012 | Kolesnikov | H04L 9/14 726/26 |
| 2016/0140274 A1* | 5/2016 | Wachs | G06F 30/00 703/2 |
| 2018/0032760 A1* | 2/2018 | Hu | G06F 21/71 |
| 2020/0257798 A1* | 8/2020 | Rao | G06F 21/556 |
| 2021/0026994 A1* | 1/2021 | Tehranipoor | G06F 30/343 |
| 2022/0019720 A1* | 1/2022 | Bhunia | G06F 30/327 |
| 2023/0052037 A1* | 2/2023 | Beaurepaire | G06V 20/56 |

* cited by examiner

*Primary Examiner* — Dao Q Ho
(74) *Attorney, Agent, or Firm* — Womble Bond Dickinson (US) LLP

(57) ABSTRACT

A method in one embodiment creates a model of an authentic IC for use in comparisons with counterfeit ICs. The model can be created by determining a first or initial set of points of interest (POIs) on the simulated physical (e.g., gate level) layout and simulating side channel leakage from each POI and then expanding the size of the POI and repeating the simulation and comparing successive simulation results (between successive sizes of POIs for a given POI) to determine if a solution for the size of the POI has converged. The final POIs are then processed in a simulation that can use multiple payloads (e.g., cryptographic data) over the entire set of final POIs, and the resulting data set can be used to create the model.

20 Claims, 9 Drawing Sheets

ADAPTIVE LEAKAGE IMPACT REGION DETECTION AND MODELING FOR COUNTERFEIT CHIPS DETECTION

BACKGROUND

This disclosure relates to characterizing electrical circuits, and more particularly to characterizing integrated circuits (ICs) such as ICs containing security related data such as cryptographic keys used in smart phones, credit cards, computers and other devices. According to one aspect, this disclosure relates to the detection of counterfeit ICs, ICs containing a hardware Trojan or recycled ICs.

Counterfeit ICs have existed for many years; the authentic IC manufacturer often uses legal enforcement mechanisms to deal with this problem, but it is often the case that the counterfeit IC appears to closely resemble the authentic IC so much that it is difficult to detect the counterfeit IC. Recycled ICs also have become a problem (particularly when there is a shortage of ICs); these recycled ICs may be authentic but have been used and are usually older versions of the IC, and this usage often means the recycled IC will not last as long as a current authentic IC. Hardware Trojans, introduced into a design by a hacker, have also become a problem. These hardware Trojans can be design to leak security data, such as cryptographic keys, to a party that uses the introduced Trojan. These problems present a need for a solution that can detect a counterfeit IC or an IC containing a hardware Trojan or a recycled IC that is an older version of a current authentic IC.

SUMMARY OF THE DESCRIPTION

A method in one embodiment creates a model of an authentic IC for use in comparisons with suspected counterfeit ICs or recycled ICs or ICs containing hardware Trojans. The model can be created by determining a first or initial set of points of interest (POIs) on the simulated physical (e.g., gate level) layout and simulating side channel leakage from each POI and then expanding the size of the POI and repeating the simulation and comparing successive simulation results (between successive sizes of POIs for a given POI) to determine if a solution for the size of the POI has converged. The final POIs are then processed in a simulation that can use multiple payloads (e.g., cryptographic data) over the entire set of final POIs, and the resulting data set can be used to create the model (e.g., a covariance model). The simulated side channel leakage can be any one or more of leakage signals derived from: power supply noise (e.g., from dynamic voltage drop simulations); thermal data; electromagnetic emission data; and tile based power. These leakage signals can be used to characterized an authentic IC as described further herein.

A method according to one embodiment can include the following operations: identifying a first set of points of interest (POI) in a simulated representation of an integrated circuit (IC), the points of interest containing security related gates that process security related data; simulating side channel leakage from each of the first set of POI and comparing data derived from each simulated side channel leakage from each of the first set of POI to a threshold value; expanding, for each of the POI, a size of the POI in response to the comparison and repeating the simulating and comparing and expanding until the comparison indicates a latest POI for each POI has converged to a solution of a final POI for each POI; performing a side channel leakage simulation at each of the final POI; and creating a model of the IC based on the side channel leakage simulation of the final POIs. In one embodiment, the simulated side channel leakage simulates a set of one or more of: (a) power noise, (b) thermal data, (c) electromagnetic emission data, or (d) tile based power. In one embodiment, the first set of POI comprises a set of one or more of: (a) a first set of POI for power noise; (b) a first set of POI for thermal data; (c) a first set of POI for electromagnetic emission data; or (d) a first set of POI for tile based power. Each of these different POIs can have different final POI regions (e.g., for a given region on the IC, a final POI for power noise may be smaller than a final POI for electromagnetic emission for the same region on the layout).

In one embodiment, the first set of POI can be generated from a ranked list of positions on a simulated layout of the IC in paths through the simulated IC, the ranked list based on potential leakage of security related data; these paths can be limited to security data related paths that convey security related data (such as cryptographic keys, etc.).

In one embodiment, the model (produced by the method) represents a fingerprint of a version of the IC that is for use in comparing the version of the IC to another version of the IC that is suspected of being a counterfeit of the IC or is suspected of containing a hardware Trojan. In one embodiment, the model comprises a covariance model of the final POIs of the IC. In one embodiment, the model is created from inputs of multiple data payloads over time that are applied to multiple POIs over a simulated layout of the IC to derive the final POI for each POI. In one embodiment, the model is compared to one of: (a) a covariance model of a suspected counterfeit IC or (b) physical measurements of the suspected counterfeit IC.

In one embodiment, the data derived from each simulated side channel leakage comprises a change in signal-to-noise ratio between a pair of simulated side channel leakages at each POI. In one embodiment, the signal-to-noise ratio is based on a signal mean divided by a standard deviation of the signal at each POI. The signal can be one of: power supply noise; or thermal data; or electromagnetic emission data; or tile based power.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a simulation system.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
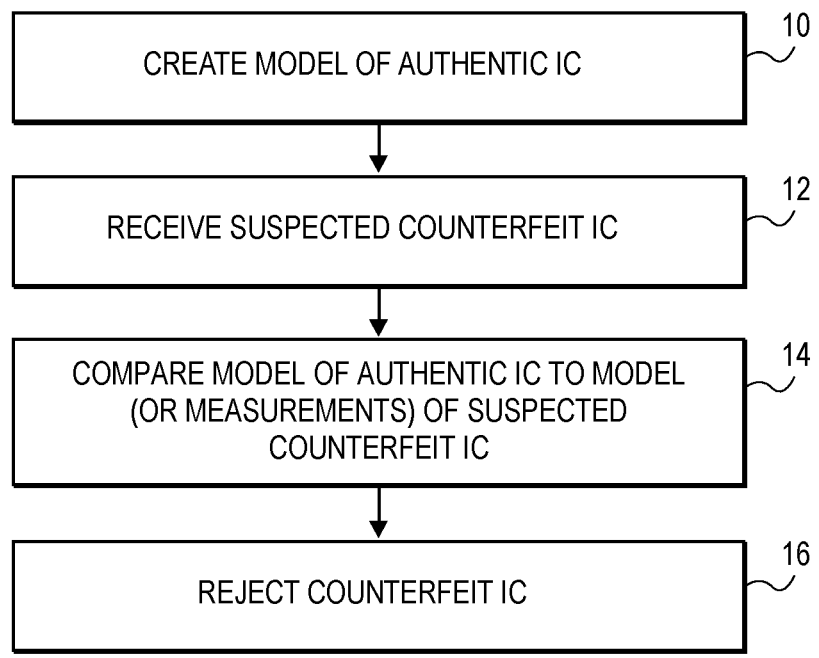
FIG. 1 shows an example of a method that can be used in one embodiment to detect a counterfeit IC.

FIG. 1 shows a method according to one embodiment that can be used to detect, for example, a counterfeit IC (or an IC with a hardware Trojan or a recycled IC). In operation 10, a model of an authentic IC is created; examples of methods for creating possible models are provided below. This model can be used to compare an authentic IC to a suspected counterfeit IC that is received in operation 12. In operation 14, the model is used to compare the authentic IC to the suspected counterfeit IC; the comparison can be between a model of the suspected counterfeit IC (created from CAD data about the IC) and the model for the authentic IC, or the comparison can be between the model for the authentic IC and measurements of the physical counterfeit IC. If the comparison reveals that the suspected counterfeit IC is in fact a counterfeit IC, then the counterfeit IC can be rejected in operation 16.

Figure 2A:
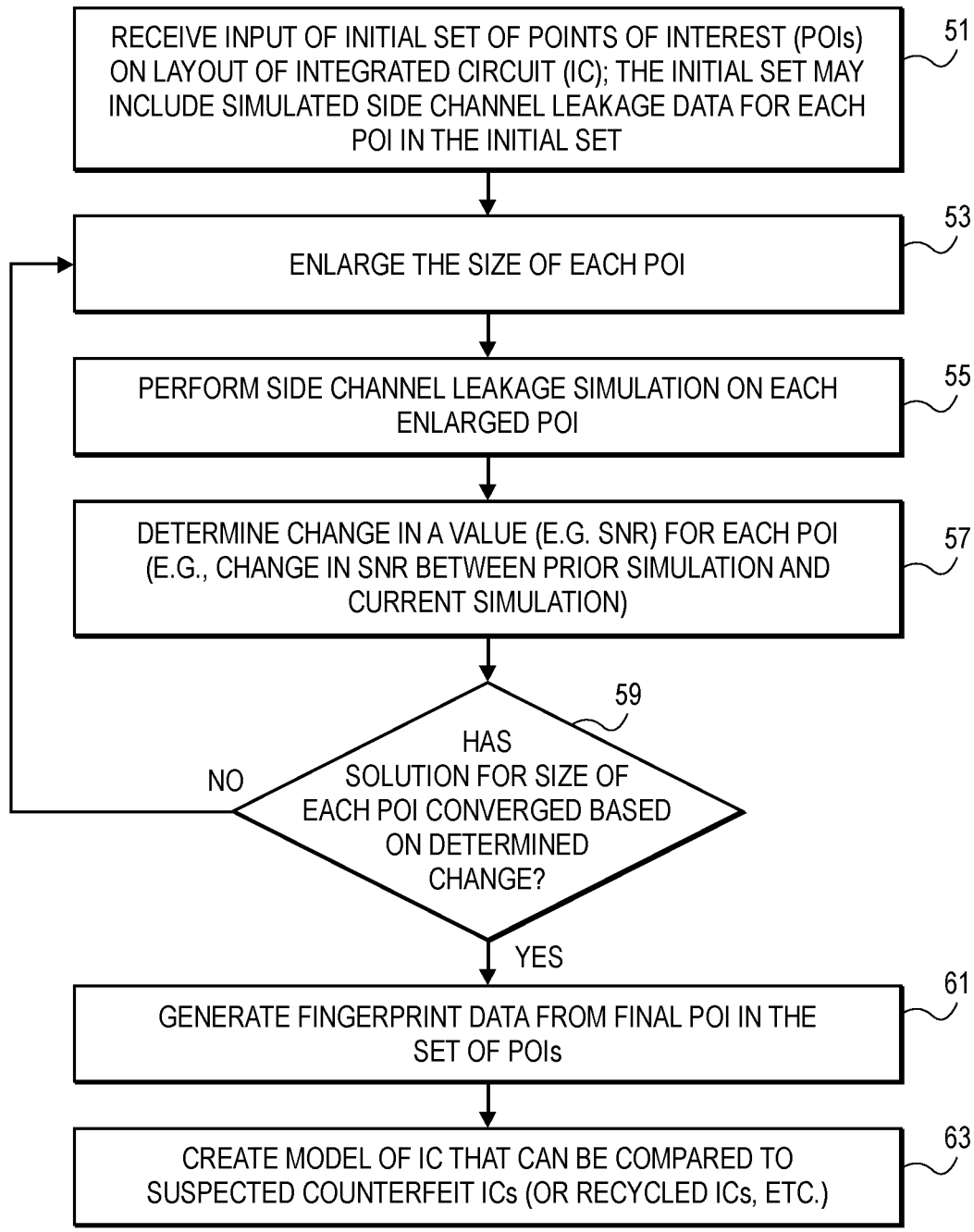
FIG. 2A is a flowchart that shows a method according to one embodiment.
Figure 2B:
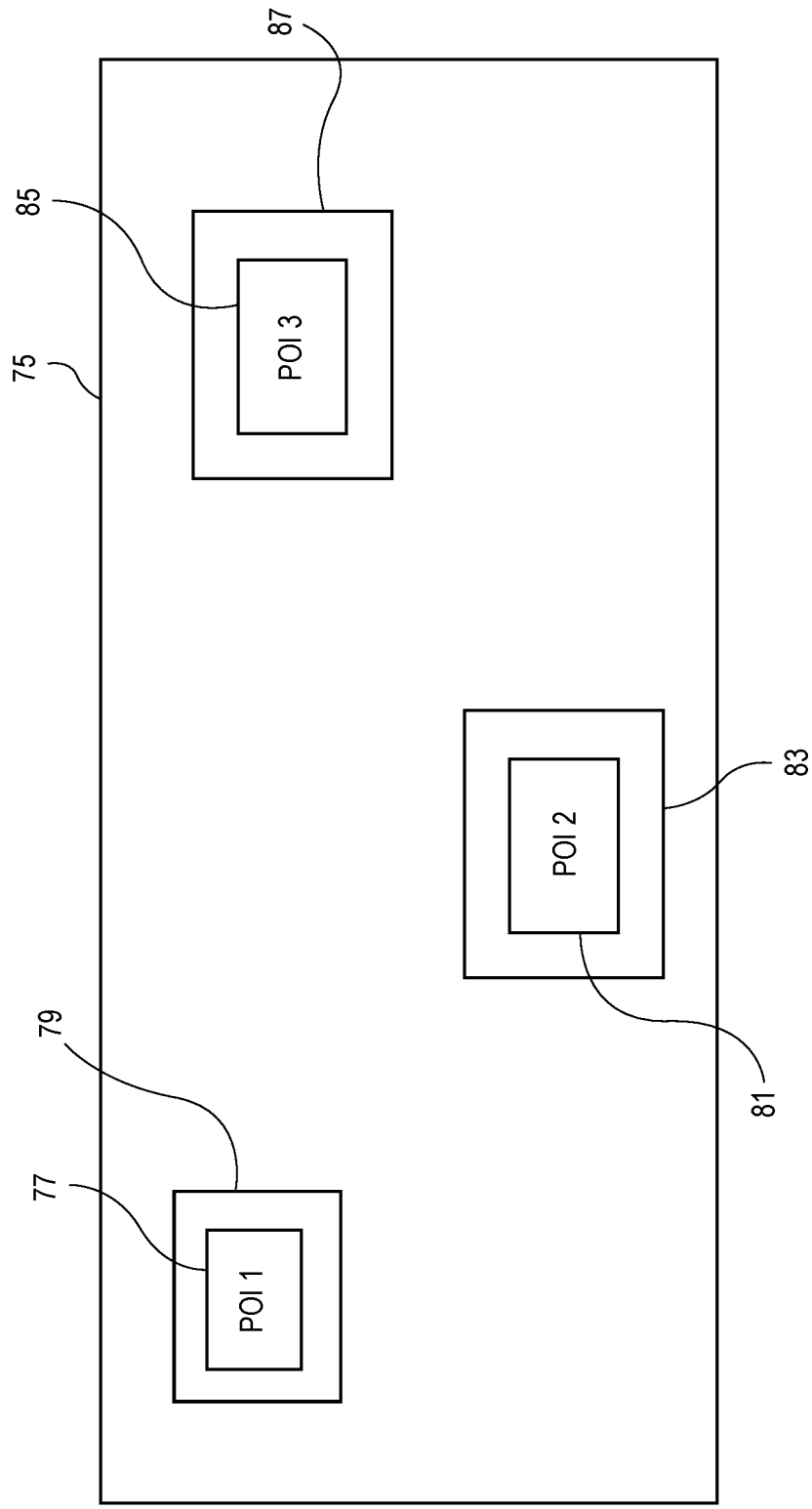
FIG. 2B shows a simulated die of an IC that uses an embodiment to enlarge points of interest (POIs), beginning with an initial or first set of POIs.

A method according to one embodiment is shown in FIG. 2A. In this method, fingerprint data, or other characterizing data, about each region in multiple regions of the IC is generated in a simulation of the IC and then used to create a model that characterizes the particular IC; the method can utilize techniques to identify the appropriate regions which can be only a portion of the IC. For example, as explained further below, selective regions can be identified based on their usage of security related data and the characterization of the IC can be limited to those regions. In operation 51 in FIG. 2A, a simulation system can receive an input that includes an identification of an initial set of points of interest (POI) on a simulated physical layout of an IC. The identification can include data about the location of each POI relative to the physical layout (in x, y space) on the die of the IC. FIG. 2B shows an example of a die 75 for an IC that has at least 3 POIs that are identified. Each of these 3 POIs can include an initial set of POIs for this IC. Each POI in the initial set of POIs can be identified using, for example, the method shown in FIG. 2C which is described further below. The POI 1 has an initial POI 77 that is part of the initial set; the POI 2 has an initial POI 81 that is part of the initial set, and the POI 3 has an initial POI 85 that is part of the initial set. Each POI in this initial set may include simulated side channel leakage data, such as one or more of: simulated side channel power noise leakage data, or simulated side channel thermal data, or simulated side channel electromagnetic emission data, or simulated tile based power. The POIs in the initial set for each of these different simulated side channel leakage data may be different, and each of these different simulated side channel leakage data will be processed separately from the POIs for other types of simulated side channel leakage data.

In operation 53 in FIG. 2A, for each POI and for each of the different types of simulated side channel leakage data, the size of the POI is enlarged. This enlargement can be configured to be small enough so that, based on prior experience with these simulations, the number of enlargements is greater than a few (e.g., greater than 1) before convergence is reached and large enough so that less than an excessive number of enlargements is required to reach convergence (e.g., less than 20). Examples of such POI region enlargements are shown in FIG. 2B. In the example shown in FIG. 2B, the initial POI 77 for POI region POI 1 is enlarged to create POI 79 for POI region POI 1. The initial POI 81 is enlarged to create POI 83 for POI region POI 2. The initial POI 85 is enlarged to create POI 87 for POI region POI 3. In the example shown in FIG. 2B, each of the POI regions is a rectangular region which may be a square, but other geometries may also be used.

After the POI regions have been enlarged in operation 53, the simulation system can perform, in operation 55, a side channel leakage simulation on each enlarged region; if multiple side channel leakage simulations are being performed (e.g., both a power supply noise [e.g., dynamic voltage drop] side channel leakage simulation and an electromagnetic emission side channel leakage simulation are being performed), each of these simulations is performed separately on each of the enlarged POIs.

Then in operation 57, the simulation system determines a change in one or more values (e.g., a change in a signal-to-noise ratio—SNR) for each type of simulation for each POI; for example, the simulation system can calculate a difference or change between a prior SNR for a POI and a current SNR for the POI after the enlargement of the POI region). In the example shown in FIG. 2B, the simulation system can determine the change in SNR, for a power noise simulation for POI 1, by computing the difference between the SNR for POI 77 (for the power noise simulation for POI 1) and the SNR for POI 79 (for the power noise simulation for POI 1). Then in operation 59, the simulation system can determine if the solution for the final size of the POI has reached a convergence based upon the computed difference for the POI. If that difference is less than a threshold value, in one embodiment, the simulation system determines that the solution for the final POI region size has converged to a solution value for the POI region size and processing proceeds to operation 61; if the simulation system determines that the solution has not converged (e.g., because the difference is larger than the threshold value), then processing for the current POI returns to operation 53 so that the size of the region for the current POI is enlarged in operation 53 and processing, by the simulation system, repeats operations 55 and 57 as shown in FIG. 2A in order to determine the final POI size for each POI being processed. In one embodiment, the SNR can be the ratio of the signal mean at the POI and the standard deviation of the signals (e.g., mean of Variances (x)/Variance of Means(x), where x is the signal such as simulated power supply noise at the POI and Variance is a form of a standard deviation calculation). For example, SNR=E(Var(x))/Var(E(x)), where Var(x)=variance of x, and E(x)=mean of x. In one embodiment, the SNR can be a form of an F-test (e.g., see https://en.wikipedia.org/wiki/F-test).

Figure 3B:
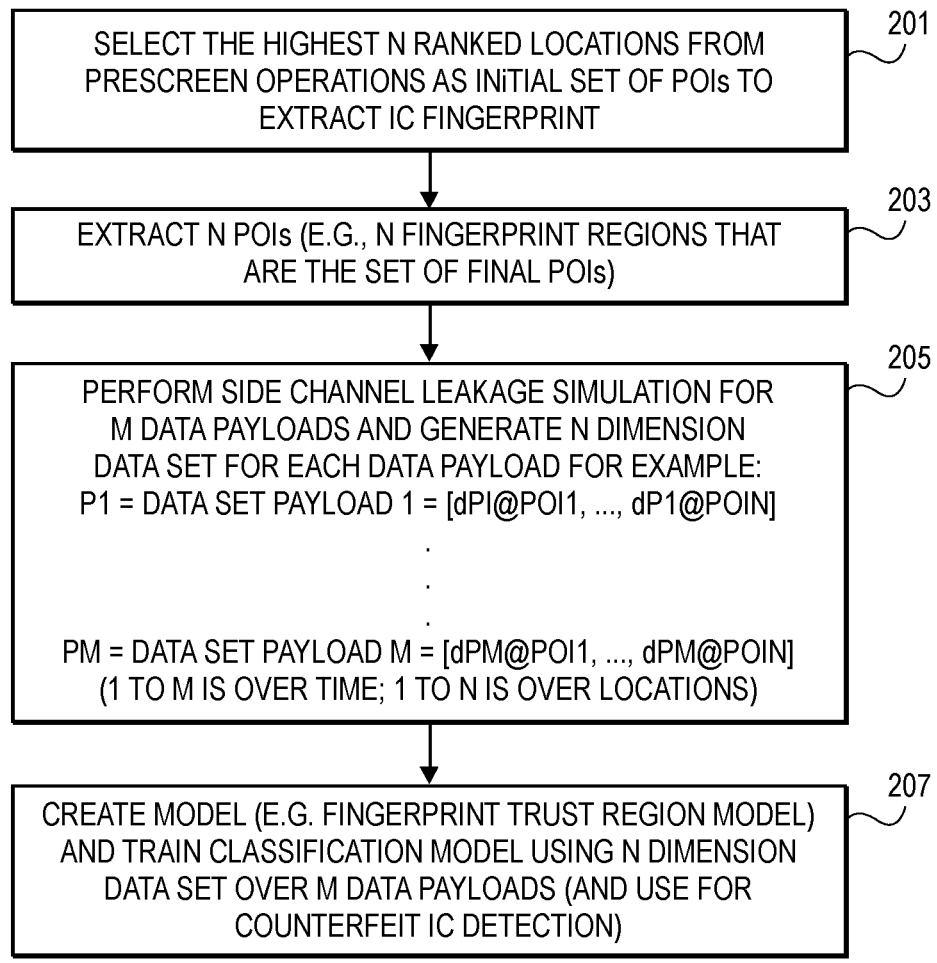
FIG. 3B shows a flowchart that depicts an embodiment that creates a data set that is used to create a model for an IC.
Figure 4:
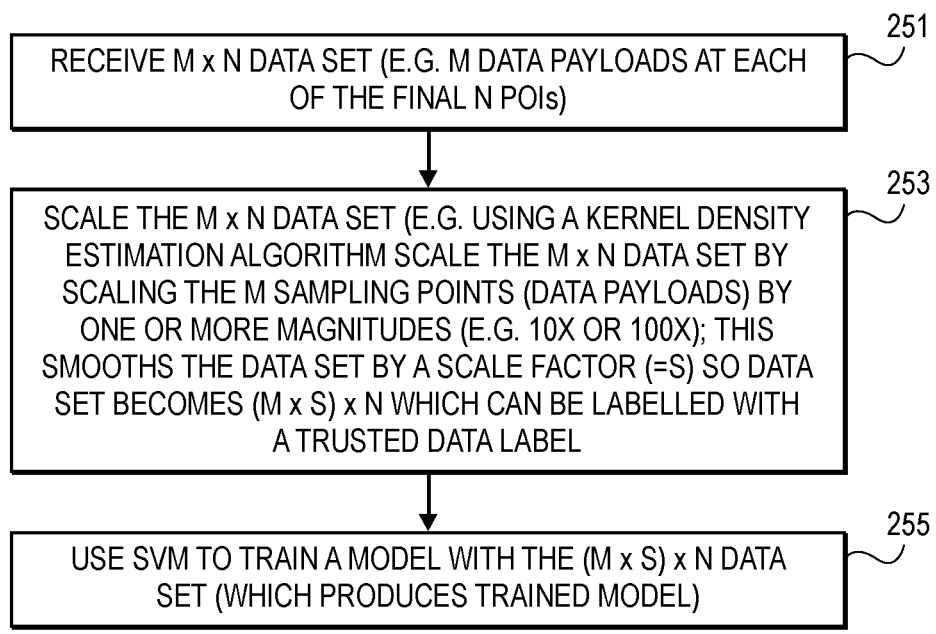
FIG. 4 is a flowchart that shows an embodiment to create a model that can be used to detect a counterfeit IC or recycled IC or an IC containing a hardware Trojan.

In operation 61, the simulation system can generate fingerprint data from each of the final POIs in the set of POIs. The method shown in FIG. 3B is an example of an embodiment of the generation of fingerprint data, and this method will be described further below. This fingerprint data can characterize an authentic IC and then be used to create a model, in operation 63, that can be used to compare an IC (either in physical or simulated form) to the authentic IC's model. The method shown in FIG. 4 is an example of an embodiment of the creation of the model of the authentic IC, and this method will be described further below. The IC that is compared to the authentic IC's model can be any one of: a suspected counterfeit IC or a recycled IC or an IC containing a hardware Trojan.

Figure 2C:
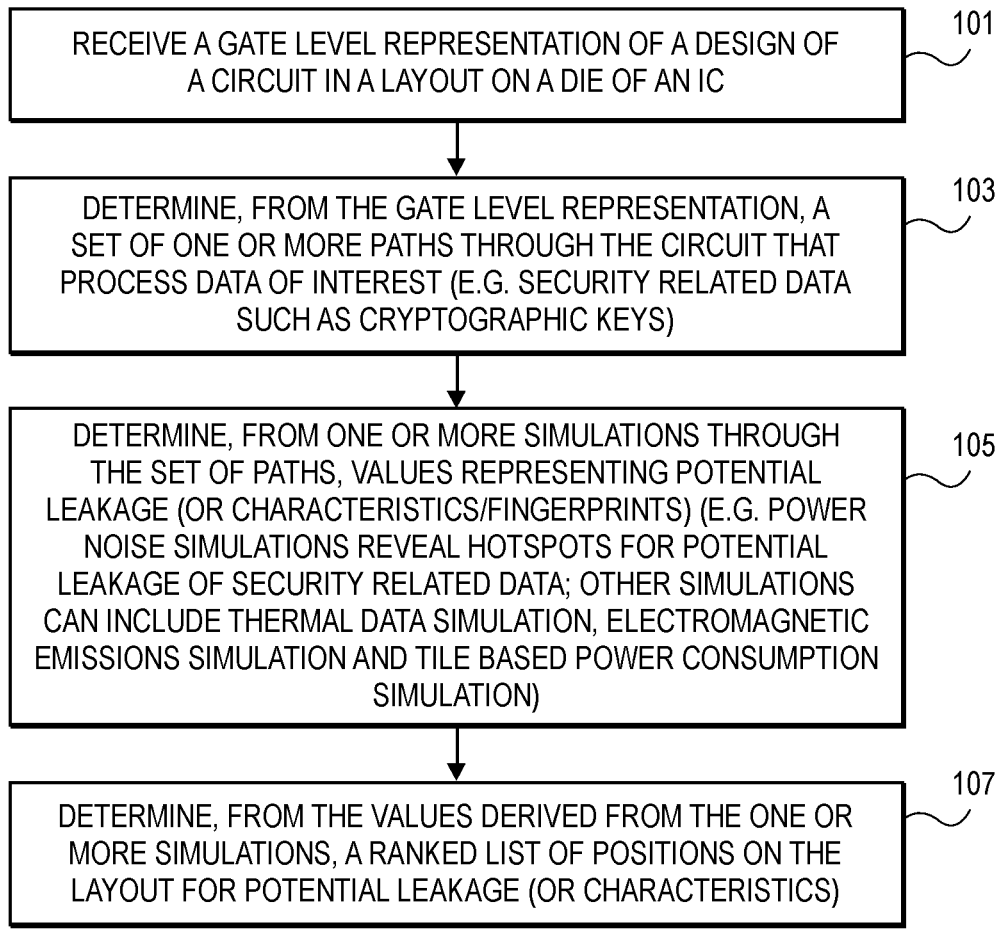
FIG. 2C is a flowchart that depicts a method for generating an initial or first set of POIs.

FIG. 2C shows a method for generating an initial set (or first set) of POIs. In operation 101, a simulation system receives a gate level representation of a design of a circuit in a layout on a die of an IC. This gate level representation may be obtained from standard circuit CAD files. Known in the art. Then in operation 103 the simulation system determines, from the gate level representation, a set of one or more paths through the circuit that process data of interest, such as security related data (for example, cryptographic keys). In operation 105, the simulation system determines, from one or more simulations through the set of paths, values representing potential leakage (or values representing characteristics or fingerprints) of an authentic IC. For example, power noise simulations can reveal hotspots for potential leakage of security related data. Other simulations can include thermal data simulations, electromagnetic emissions simulations and tile based power consumption simulations. These various simulations can generate the characteristics or fingerprints for various regions of the authentic IC. Then in operation 107 the simulation system can determine, from the values derived from one or more simulations, a ranked list of positions on the layout of the IC for potential leakage or other potential characteristics. Further information about the method shown in FIG. 2C can be obtained from U.S. patent application Ser. No. 17/174,436, filed on Feb. 12, 2021 by the Applicant Ansys, Inc., which application is incorporated herein by reference. The method shown in FIG. 2C can generate an initial set of POIs and provide the initial set as an input which is received in operation 51 shown in FIG. 2A.

Figure 3A:
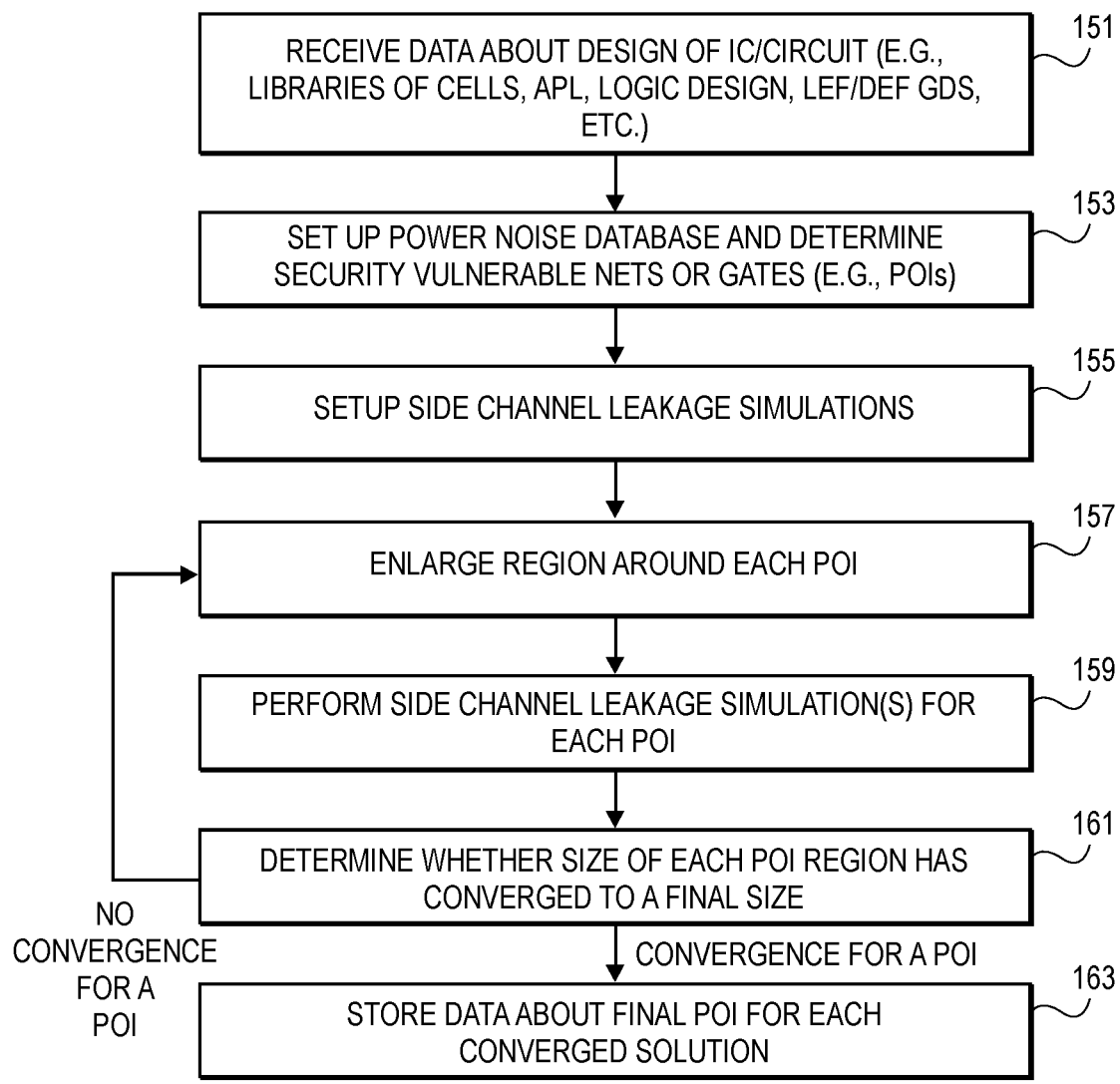
FIG. 3A is a flowchart that illustrates a method according to one embodiment to generate a set of final POIs.

The method shown in FIG. 3A shows further details about some of the operations in FIG. 2A. In particular, the method in FIG. 3A shows how a simulation system, once the initial POIs have been created, can generate the final set of final POIs. In operation 151, the simulation system receives data about the design of an integrated circuit, and this data can include conventional design data about a circuit such as data about libraries of cells in the circuit, APL data, logic design data, LEF/DEF GDS data, etc. This data can be used, as is known in the art, to extract the power supply gird network for use in power noise simulations (e.g., dynamic voltage drop simulations). The logic design can be converted to a vector and model gate as power current source. The simulation system in 153 can set up a power noise data base and can also determine the security vulnerable nets or gates from which the set of POIs can be determined. Then in operation 155 the simulation system or data processing system can set up one or more side channel leakage simulations (which can include the insertion of virtual probes at each POI to measure simulated leakage). Then in operation 157, the simulation system enlarges a region on the layout around each POI. Then in operation 159, the simulation system performs one or more side channel leakage simulations for each POI. Then in operation 161, the simulation system determines whether the size of each POI region has converged to a final size. In one embodiment, this convergence can be tested by an SNR ratio as described above. If there is no convergence, processing reverts back to operation 157 so that the simulation system can continue to attempt to achieve convergence for the size of each POI. If convergence is obtained as determined in operation 161, then data about each final POI is stored (in operation 163) for use in creating fingerprint data as in, for example, operation 61 in FIG. 2A.

Fingerprint data can be generated using, in one embodiment, the method shown in FIG. 3B. In operation 201, the simulation system selects the highest N ranked locations from pre-screening operations as an initial set of POIs to extract fingerprints from an authentic IC. The method shown in FIG. 2C shows an example of how the highest N ranked locations can be obtained. In operation 203 in FIG. 3B, the simulation system extracts N final POIs that were derived from the highest N ranked locations. The extracted N POIs can be the final set of POIs created through operations 53, 55, 57, and 59 shown in FIG. 2A. Once the final POIs have been extracted, the simulation system can, in operation 205 shown in FIG. 3B, perform one or more side channel leakage simulations for M data payloads and generate an N dimension data set for each data payload. This data set is an M×N matrix in one embodiment where 1 to M is a set of data payloads over time and 1 to N is over the multiple locations of the N final POIs. For example, the data set payload for the first data payload (M=1) can be expressed as N values from [dP1@POI 1, ..., dP1@POI N]. The Mth data payload set can be expressed as N values from [dPM@POI 1, ..., dPM@POI N]. The M×N data set can then be used in operation 207 to create a model for the authentic IC which can be a fingerprint trust region model for the authentic IC. This model can be trained, with the M×N data set to create a classifier which can then be used to detect, for example, a counterfeit IC or an IC containing a hardware Trojan.

FIG. 4 shows a method according to one embodiment to create a model that can be used to detect a counterfeit IC or a recycled IC or an IC containing a hardware Trojan. The method can begin in operation 251 in which the simulation system receives the M×N data set. In operation 253 the simulation system scales the M×N data set. In one embodiment, the scaling may use a kernel density estimation algorithm to scale the M×N data set by scaling the number of sampling points (the M number of data payloads). In one embodiment, the scaling may increase the number of M sampling points by one or magnitudes such as 10× or 100×. In one embodiment, this scaling smooths the data set by a scale factor (S) so that the data set becomes (M×S)×N which can be labeled with a trusted data label. The simulation system can then train a model (e.g., a statistical model) using the (M×S)×N data set to produce a trained model which can be a model based on a class 1 SVM (support vector machine). As is known in the art, a support vector machine is a supervised model with associated learning algorithms that analyze data for classification and regression analysis.

Figure 5A:
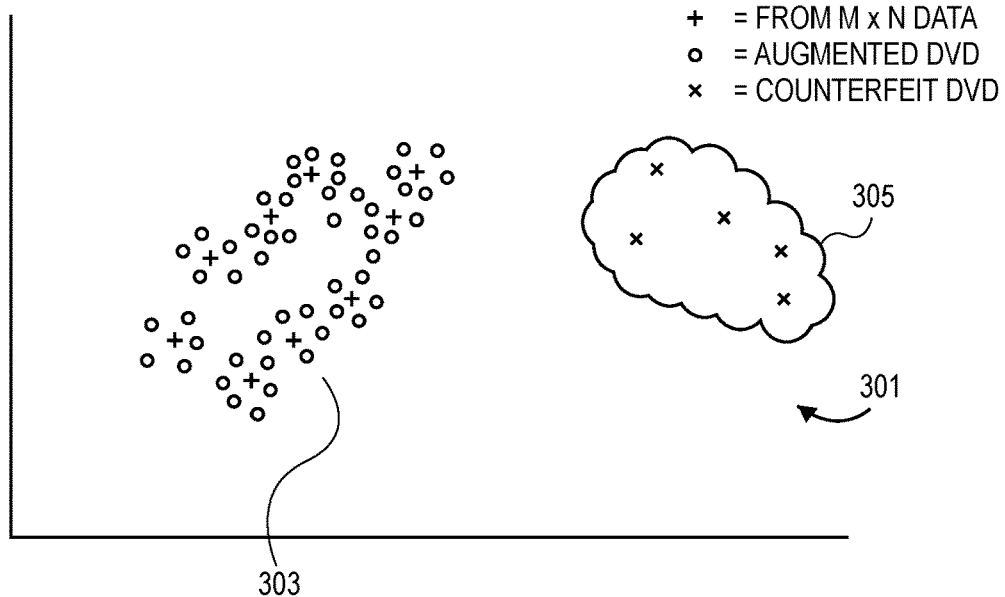
FIG. 5A shows a comparison of a covariance model of an authentic IC to a covariance model of a suspected counterfeit IC.

In one embodiment, the trained model seeks to identify the side channel fingerprint boundary of the authentic IC based on the data set (e.g., M×N or (M×S)×N) data sets) for the IC. The identification of the side channel fingerprint boundary can be considered a high dimensional variable probability distribution density problem. In one embodiment, a kernel density estimation (KDE) function can be used to provide the trained model based on the data set. A KDE is a non-parametric way to estimate the probability density function of a random variable. Multiple single dimensional probability density functions can be estimated from the observation of each portion of the N-dimensional fingerprint vector (across the M or augmented M data payloads), and these multiple single dimensional probability density functions can form the estimation function of the kernel density by linear superposition. After normalization, it is the kernel density probability density function. FIG. 5A visually shows how such model can identify the side channel fingerprint boundary. This graph 301 in FIG. 5A shows the distribution, over two or more random variables (e.g., from the top three principal components in a principal components analysis), of values 303 derived from the training data (e.g., M×N data set and the augmented data set of (M×S)×N). As shown in FIG. 5A, the distribution or boundary of values 305 from a simulated or physically measured IC (e.g., a suspected counterfeit IC) are clearly distinguishable from the boundary of the values 303 from the authentic IC. Each dot (e.g., a "+" or "o" or "x") in graph 301 is an N dimensional vector from a principal components analysis; for example, in one embodiment, the graph 301 can be generated from a principal components analysis of each of the N vectors in the M×N data set. The model, once trained using the data set, can then be used to classify an IC as shown in FIG. 5B.

Figure 5B:
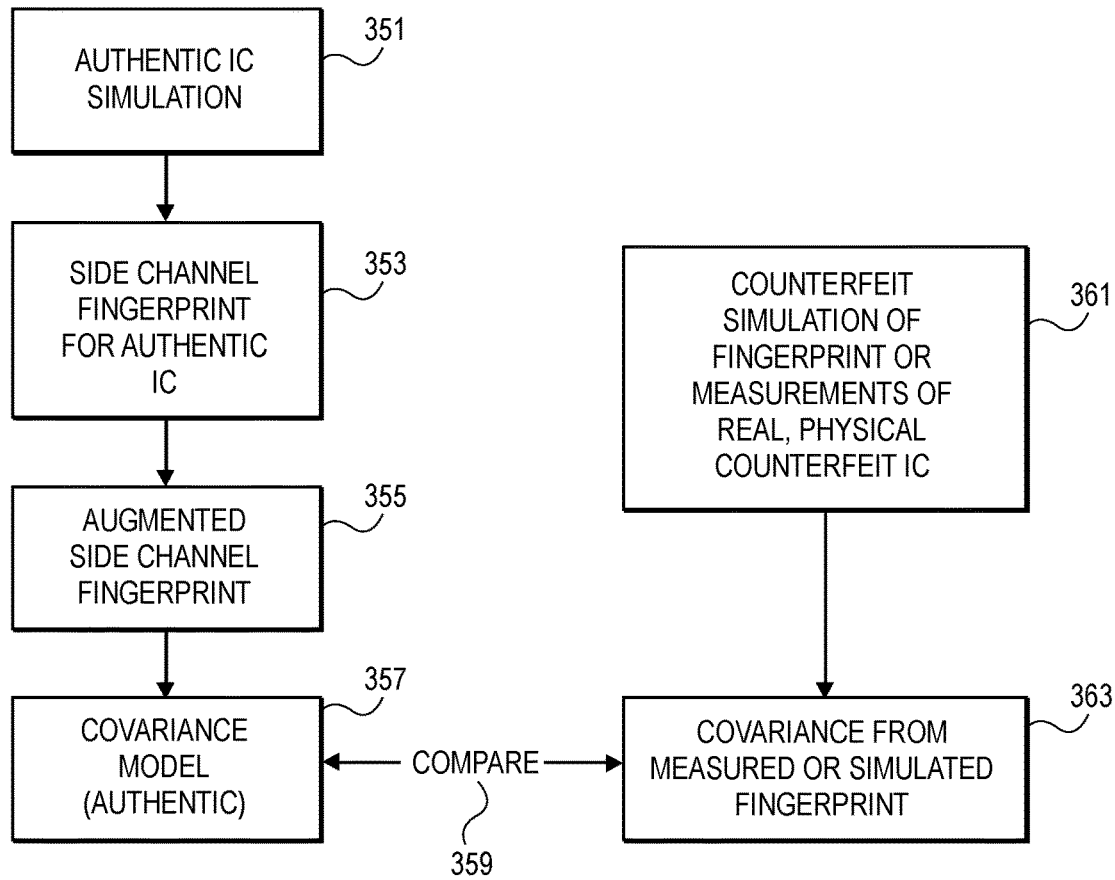
FIG. 5B is a flowchart that illustrates a method for detecting a counterfeit IC (or recycled IC or IC containing a hardware Trojan).

Referring now to FIG. 5B, the comparison of a suspect IC to an authentic IC can begin with the one or more simulations 351 of the authentic IC that produce one or more side channel fingerprints 353 for the authentic IC. The fingerprints can be augmented (e.g., using the operation 253 in FIG. 4) to create an augmented side channel fingerprint 355 that can be used to create a model 357. This model 357 can be compared (in operation 359) with either a model 363 derived from a suspected IC (e.g., from design files of the suspected IC used to perform simulations in operation 361) or physical measurements 363 of the suspected IC. The physical suspected IC can be measured using available sensors known in the art (e.g., on IC sensors from Protean-Tecs which can provide location dependent thermal/latency/voltage drop information). The comparison 359 can reveal whether the suspected IC is authentic or not. The physical measurements may be obtained at the same locations of the POIs on the authentic IC over the same set of M payloads to derive a data set that can then be processed for a comparison 359.

Figure 6:
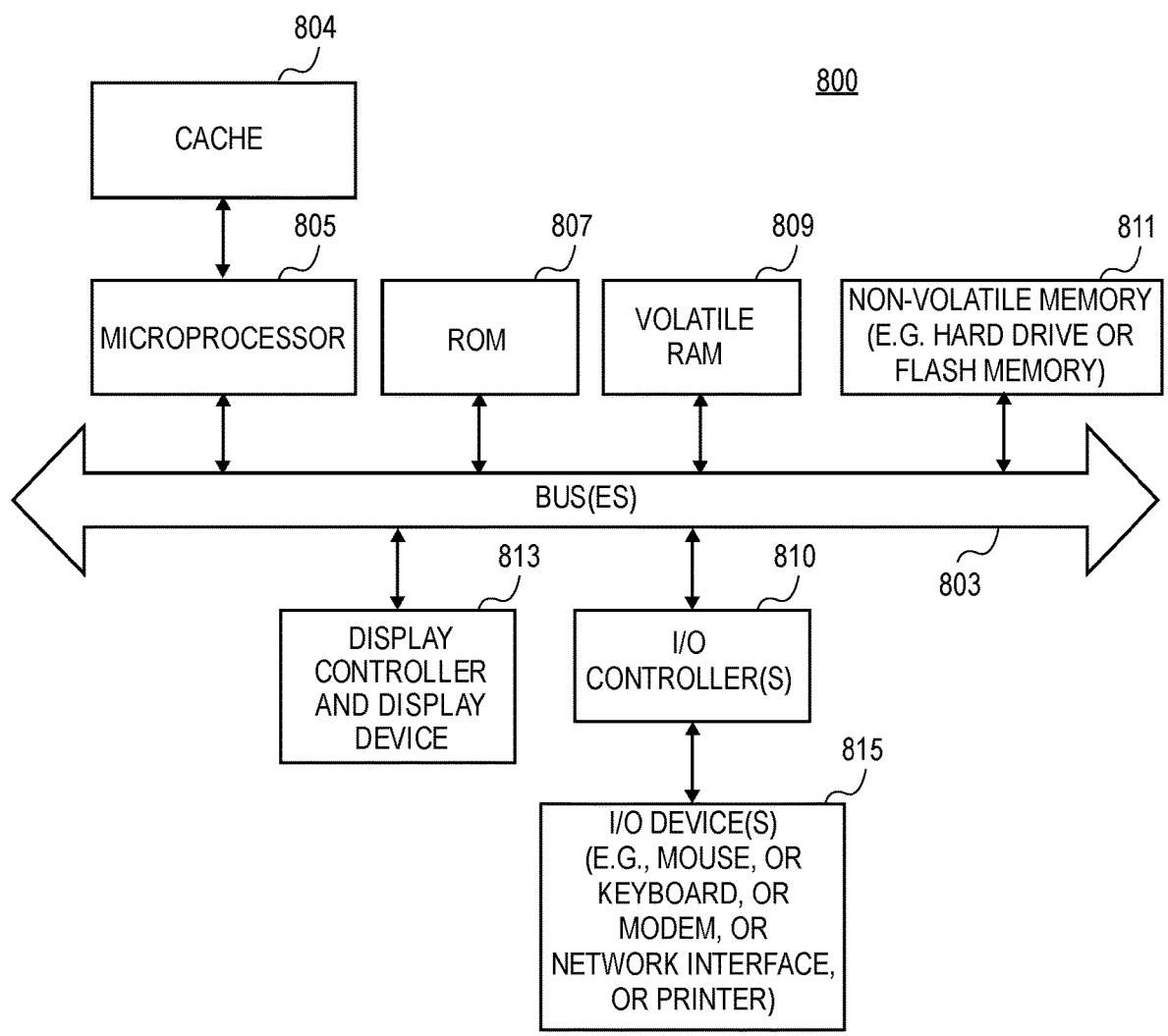
FIG. 6 shows an example of a data processing system that can be used to implement one or more embodiments described herein.

FIG. 6 shows one example of a data processing system 800, which may be used with one embodiment. For example, the system 800 may be implemented to provide a system or device that performs any one of the methods described herein. Thus, the system 800 is an example of a simulation system, and the system 800 can execute the simulation software described herein. Note that while FIG. 6 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 6, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 6 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable computer program instructions which when executed by a data processing system cause the data processing system to perform a method, the method comprising:
   identifying a first set of points of interest (POI) in a simulated representation of an integrated circuit (IC), the points of interest containing security related gates that process security related data;
   simulating side channel leakage from each of the first set of POI and comparing data derived from each simulated side channel leakage from each of the first set of POI to a threshold value;
   expanding, for each of the POI, a size of the POI in response to the comparison and repeating the simulating and comparing and expanding until the comparison indicates a latest POI for each POI has converged to a solution of a final POI for each POI;
   performing a side channel leakage simulation at each of the final POI;
   creating a model of the IC based on the side channel leakage simulation of the final POIs.

2. The non-transitory machine readable medium as in claim 1, wherein the simulated side channel leakage simulates a set of one or more of: (a) power noise, (b) thermal data, (c) electromagnetic emission data, or (d) tile based power.

3. The non-transitory machine readable medium as in claim 2, wherein the first set of POI comprises a set of one or more of: (a) a first set of POI for power noise; (b) a first set of POI for thermal data; (c) a first set of POI for electromagnetic emission data; or (d) a first set of POI for tile based power.

4. The non-transitory machine readable medium as in claim 1, wherein the first set of POI is generated from a ranked list of positions on a simulated layout of the IC in paths through the simulated IC, the ranked list based on potential leakage of security related data.

5. The non-transitory machine readable medium as in claim 1, wherein the model represents a fingerprint of a version of the IC that is for use in comparing the version of the IC to another version of the IC that is suspected of being a counterfeit of the IC.

6. The non-transitory machine readable medium as in claim 1, wherein the data derived from each simulated side channel leakage comprises a change in signal-to-noise ratio between a pair of simulated side channel leakages at each POI.

7. The non-transitory machine readable medium as in claim 6, wherein the model is created from inputs of multiple data payloads over time that are applied to multiple POIs over a simulated layout of the IC to derive the final POI for each POI.

8. The non-transitory machine readable medium as in claim 7, wherein the model comprises a covariance model of the final POIs of the IC.

9. The non-transitory machine readable medium as in claim 8, wherein the model is compared to one of: (a) a covariance model of a suspected counterfeit IC or (b) physical measurements of the suspected counterfeit IC.

10. The non-transitory machine readable medium as in claim 6, wherein the signal-to-noise ratio is based on a signal mean divided by a standard deviation of the signal at each POI.

11. A machine implemented method, the method comprising:
   identifying a first set of points of interest (POI) in a simulated representation of an integrated circuit (IC), the points of interest containing security related gates that process security related data;
   simulating side channel leakage from each of the first set of POI and comparing data derived from each simulated side channel leakage from each of the first set of POI to a threshold value;
   expanding, for each of the POI, a size of the POI in response to the comparison and repeating the simulating and comparing and expanding until the comparison indicates a latest POI for each POI has converged to a solution of a final POI for each POI;
   performing a side channel leakage simulation at each of the final POI;
   creating a model of the IC based on the side channel leakage simulation of the final POIs.

12. The method as in claim 11, wherein the simulated side channel leakage simulates a set of one or more of: (a) power noise, (b) thermal data, (c) electromagnetic emission data, or (d) tile based power.

13. The method as in claim 12, wherein the first set of POI comprises a set of one or more of: (a) a first set of POI for power noise; (b) a first set of POI for thermal data; (c) a first set of POI for electromagnetic emission data; or (d) a first set of POI for tile based power.

14. The method as in claim 11, wherein the first set of POI is generated from a ranked list of positions on a simulated layout of the IC in paths through the simulated IC, the ranked list based on potential leakage of security related data.

15. The method as in claim 11, wherein the model represents a fingerprint of a version of the IC that is for use in comparing the version of the IC to another version of the IC that is suspected of being a counterfeit of the IC.

16. The method as in claim 11, wherein the data derived from each simulated side channel leakage comprises a change in signal-to-noise ratio between a pair of simulated side channel leakages at each POI.

17. The method as in claim 16, wherein the model is created from inputs of multiple data payloads over time that are applied to multiple POIs over a simulated layout of the IC, to derive the final POI for each POI.

18. The method as in claim 17, wherein the model comprises a covariance model of the final POIs of the IC.

19. The method as in claim 18, wherein the model is compared to one of: (a) a covariance model of a suspected counterfeit IC or (b) physical measurements of the suspected counterfeit IC.

20. The method as in claim 16, wherein the signal-to-noise ratio is based on a signal mean divided by a standard deviation of the signal at each POI.

* * * * *